Oct. 8, 1940.  E. R. EVANS  2,216,771
AUTOMATIC CLUTCH
Original Filed Dec. 11, 1933  2 Sheets-Sheet 1
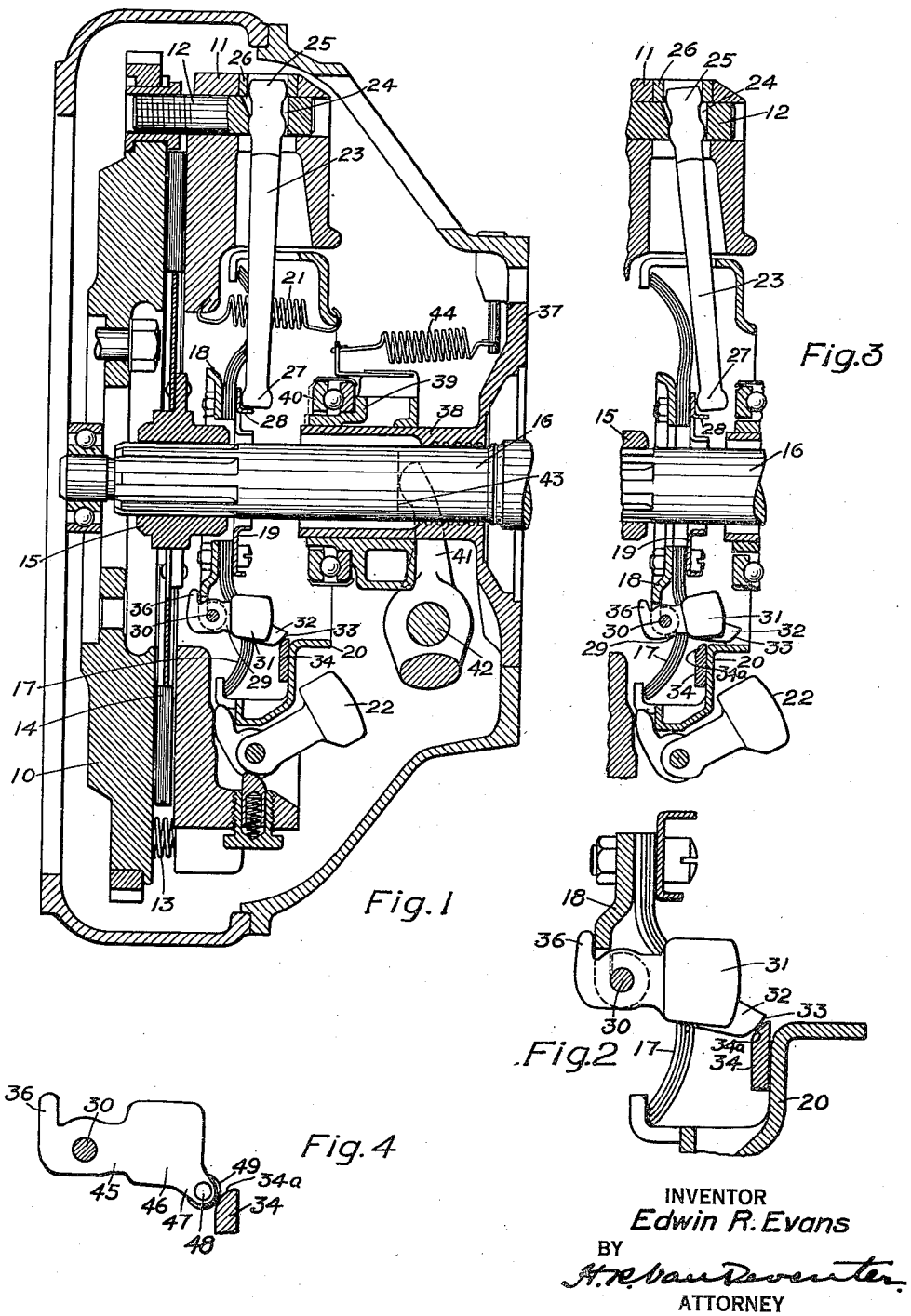
INVENTOR
Edwin R. Evans
BY
ATTORNEY

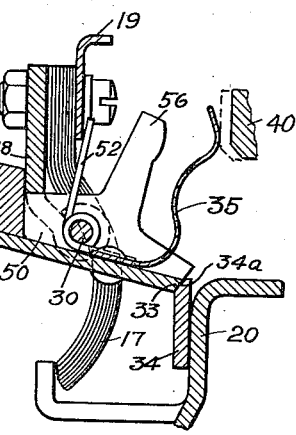

Patented Oct. 8, 1940

2,216,771

UNITED STATES PATENT OFFICE 2,216,771

AUTOMATIC CLUTCH

Edwin R. Evans, Orchard Lake Village, Mich.

Application December 11, 1933, Serial No. 701,735
Renewed August 28, 1939

12 Claims. (Cl. 192—105)

This invention relates to improvements in automatic clutches for use on automotive engines.

In the pending application Serial No. 676,269, filed June 17, 1933, entitled Clutch devices, is described a clutch in which engagement is caused by centrifugal force as the engine is speeded above idling speed, the centrifugal force being applied through springs. Automatic disengagement is permitted by a series of latches which hold the spring in partially flexed condition as the engine speed drops to idling and the centrifugal force decreases. By manually releasing the latches, permitting the springs to further unflex, the clutch may be caused to function as an ordinary clutch. Normally, however, the latches remain effective to hold the clutch disengaged whenever the engine is idling or stopped.

The object of the present invention, which is a continuation in part of the aforesaid application, is to provide latching means effective as described above at idling or higher speeds, but which automatically drops out to place the clutch in manual control when the engine is stopped.

This improvement in automatic clutches is an important safety device, by which the dangers of accident due to carelessness are naturally reduced. For instance, if a car using an ordinary automatic clutch is parked and the motor stopped, a gear may be left in mesh. The driver, upon returning to the car and restarting the engine may forget that the gear is engaged. Under these conditions, if he races the engine, a common practice especially in cold weather, the automatic clutch will engage and start the car without warning and an accident is often likely to result.

With the present invention, the clutch becomes the same in action as an ordinary non-automatic clutch when the engine is stopped. The driver, being made aware of this fact, necessarily becomes accustomed to take the usual precaution of placing the gears in neutral before starting the motor.

The invention consists substantially in the construction, combination, location and relative arrangement of parts, all as will be more fully hereinafter set forth as shown by the accompanying drawings and finally pointed out in the appended claims.

Referring to the drawings:

Fig. 1 is a vertical section of a centrifugal automatic clutch of the type described in my pending application, but embodying an improved latching means, the parts being shown in idling position.

Fig. 2 is an enlarged view of the latch and related parts.

Fig. 3 is a fragmentary view of the clutch showing the latch released.

Fig. 3a is a radial sectional view showing a slight modification of the construction illustrated in Figs. 1, 2, and 3.

Fig. 4 illustrates an alternative form of latch.

Fig. 5 illustrates another form of latch in which latching engagement is provided by springs instead of centrifugal force.

Fig. 6 illustrates another form of latch in which disengagement is provided by a spring attached to the latch itself.

Referring to Fig. 1, the numeral 10 denotes the flywheel of an automotive engine. A presser plate 11 is slidable on drive pins 12 adjustably supported in the flywheel 11, and urged away from the flywheel face by disengaging springs 13.

A driven member 14, fastened to a hub 15 which is splined to a driven shaft 16, is disposed between the flywheel 10 and the presser plate 11.

A plurality of radially disposed finger springs 17, are clamped between ring plates 18 and 19 surrounding the shaft 16.

The outer ends of finger springs 17 bear to the left against a cage member 20 urged toward the presser plate 11 by retracting springs 21. The numeral 22 denotes a series of weights pivoted to the presser plate 11 and adapted in swinging outward centrifugally to move the cage 20 to the right.

The numeral 23 denotes a plurality of radially disposed levers fulcrumed in slots 24 in the drive pins 12. The outer rounded ends 25 of levers 23 engage a bushing 26 in the presser plate 11. The inner rounded ends 27 of levers 25 are supported on steps 28 formed on the plate 19.

A plurality of latches 29, pivoted at 30 to the plate 18, have weighted portions 31. The numeral 32 denotes foot portions of latches 29 having latching surfaces 33 adapted to engage latching surfaces 34a on shoes 34 fixed on the cage 20.

The numeral 36 denotes stop lugs formed on the latches 29 and adapted to engage the plate 18 to limit the outward swing of the said latches.

The stationary end plate 37, has a cylindrical extension 38 surrounding the shaft 16. A collar member 39, slidably mounted on extension 38, supports a thrust bearing 40. A yoke 41, fixed on a cross-shaft 42 engages shoulders 43 on the collar member 39. The numeral 44 denotes a retracting spring urging collar member 39 to the right.

The parts shown in Figs. 2 and 3 being identical with those of Fig. 1, are denoted by the same numbers.

Referring to Fig. 3a, the construction shown duplicates that of Figs. 1, 2, and 3, except that there are added finger springs 35' preferably of sheet metal, one secured to each weight 31 to function as hereinafter explained.

Referring to Fig. 4, the numeral 45 generally denotes an alternative form of latch having a weighted portion 46 having lugs 47 supporting a cross pin 48. The numeral 49 denotes a roller on the pin 48, adapted to engage the shoe 34.

Referring to Fig. 5, the numeral 50 generally denotes an alternative form of latch carrying a counterbalance weight 51, and urged into engagement by a torsion spring 52, coiled around the pivot 30.

A leaf spring 35, similar to the spring 35' of Fig. 3a, is employed on latch 50. The numeral 56 denotes a rigid extension of latch 50.

Referring to Fig. 6, the numeral 53 generally denotes a latch carrying a centrifugal weight 54 and urged out of engagement by a torsion spring 55.

The general operation of the type of clutch shown has been fully described in my above mentioned pending application, and need therefore be described herein only in sufficient detail to make clear the modification due to the present invention.

Assuming the motor to be idling, as in Fig. 1, an opening of the throttle with consequent increase in speed causes the weights 22 to swing outward centrifugally and move the cage 20 to the right. The force and consequent motion thus produced is transmitted through the finger springs 17 and the plate 19 to the inner ends 27 of levers 23, swinging them to the right about their fulcrums in pins 12. The outer rounded ends 25 press to the left against the bushings 26, moving the presser plate 11 toward the flywheel 10 against the resistance of springs 13. The driven member 14 is thereby engaged between the flywheel and presser plate, transmitting the drive to the shaft 16.

It will be noted that the initial clearance between the driving and driven members is due to the latches 29, which bridge the distance between the pivot pins 30 and the shoes 34, thus holding the finger springs 17 in partially flexed position. Were these latches not present, the springs 17 by further unflexing would hold the plate 19 and consequently the lever ends 27 forced to the right, thus holding the clutch engaged at all times unless disengaged manually.

The latching surfaces 33 on the latch feet 31 make a slight "slip" angle with the surfaces 34a. The tendency therefore is for the springs 17 to force the latches out of engagement. When the motor is running, the weighted portions 31 provide sufficient centrifugal force to overcome this tendency, and the latches maintain the clutch clearance at idling speed. When the motor is stopped, however, the springs force the latches out of engagement as shown in Fig. 3.

The clutch is now subject only to manual operation, being in effect an ordinary clutch without automatic control. Consequently the usual procedure must be followed in restarting, that is the clutch must be disengaged manually before a gear is placed in mesh, or returned to automatic position by speeding the motor as will hereafter be explained.

To disengage the clutch manually, the usual pedal (not shown) is depressed, turning the cross-shaft 42 counterclockwise. The yoke 41, bearing against the shoulders 43, moves the collar 39 to the left. The thrust bearing 40 engages the ends 27 of levers 23, forcing them to the left and disengaging the clutch. A gear may now be placed in mesh and the car started by the usual manual retraction of the clutch.

Should it be desired to start the car with automatic clutch action, the following procedure is followed:

The motor having been started with the transmission gears in neutral, the motor is assumed first to be idling. At this speed the latches 29 would have sufficient centrifugal force to engage and hold. Having dropped out as the engine stopped, however, they have over-run the shoes as shown in Fig. 3, and consequently cannot engage the latter at idling speed wherein the weights 22 have not taken effect. If however, the motor is speeded up, (the gear still being in neutral) the weights 22 move the cage 20 to the right until the shoes 34 move past the cam faces 33, allowing the latches to swing outward into latching position. The motor now being slowed down to idling speed, the latches remain engaged, causing the clutch to automatically disengage as shown in Fig. 1. A gear may now be placed in mesh and the car started with full automatic clutch action as previously described.

The latch shown in Fig. 4 operates in the same manner as described, the roller 49 engaging the shoe 34.

The stop lugs 36 by engaging the plate 18, limit the outward swing of the latches so as to hold the cam faces 33 or rollers 49 in proper position on shoes 33.

In some cases it may be desired to provide means by which the speed at which the latches drop out can be adjusted to compensate for changes in unlatching pressure of springs 17 due to clutch wear and to afford the driver a measure of control over the drop-out speed. For this purpose the leaf springs 35' may be provided as shown in Fig. 3a. In this case the latching surfaces 33 and 34a are inclined at a slight "sticking angle" so that the force of springs 17 alone, is insufficient to cause unlatching. The manual throw-out bearing 40 is moved forward so as to press against springs 35', which thereby provide a force augmenting springs 17 to cause disengagement as the centrifugal force of 31 decreases to the desired point.

The positioning of the throw-out bearing 40 may be determined by the usual throw-out adjustment (not shown). The force of springs 35' and hence the drop-out speed of the latch may also be varied at the will of the driver by a slight depression of the clutch pedal.

With the form of latch shown in Fig. 5, latching is caused by the torsion spring 52, instead of centrifugal force, the counterbalance weight 51 preventing centrifugal action. In this case the unlatching against the force of spring 52 and friction of faces 33 and 34a by the springs 17 may be augmented if desired by springs 35 similar to spring 35' previously described. The latch 50 is provided with a rigid extension 56, providing for positive manual unlatching as described in my above mentioned application Serial No. 676,269.

With the form of latch 53 shown in Fig. 6, centrifugal force of the weight 54 and friction of surfaces 33 and 34a tend to maintain latching engagement, while unlatching is accomplished by the torsion springs 55 augmented by springs 17.

It is obvious that none of the devices described interferes with manual disengagement of the clutch by normal movement of the disengaging means as the throw-out bearing 40 swings the levers 23 to the left and thereby disengages the clutching members directly.

Although the invention has been disclosed in connection with the specific details of preferred embodiments thereof, it must be understood that such details are not intended to be limitative of the invention except insofar as set forth in the accompanying claims.

What is claimed is:

1. In a clutch, in combination, a driving member and a driven member, spring means urging said members out of frictional engagement, a second spring means adapted to overcome said first spring means, centrifugal means adapted to act through said second spring means to cause engagement of said members upon increase of speed of said driving member, latching means adapted to render said second spring means inoperative upon decrease of speed and thereby permit said first spring means to cause disengagement of said members, and means controlled by the speed of said driving member for rendering said latching means inoperative when said speed falls below a predetermined point.

2. In a clutch, in combination, a driving member and a driven member, spring means urging said members out of frictional engagement, a second spring means adapted to overcome said first spring means, centrifugal means attached to said driving member and adapted to act through said second spring means to cause engagement of said members upon increase of speed of said driving member, latching means adapted to disable said second spring means upon decrease of speed and thereby permit said first spring means to cause disengagement of said members, said latching means including coacting weights and shoes having inclined surfaces adapted to be held in engagement by surface friction and by centrifugal force generated in said weights, and spring means urging said surfaces out of latching engagement.

3. In a clutch, in combination, a driving member and a driven member, spring means urging said members out of frictional engagement, a second spring means adapted to overcome said first spring means, centrifugal means attached to said driving member and adapted to act through said second spring means to cause engagement of said members upon increase of speed of said driving member, latching means adapted to disable said second spring means upon decrease of speed and thereby permit said first spring means to cause disengagement of said members, said latching means including coacting weights and shoes having inclined surfaces adapted to be held in engagement by surface friction and by centrifugal force generated in said weights, spring means urging said surfaces out of latching engagement, and manual means for augmenting said last mentioned spring means.

4. In a clutch, in combination, a driving member and a driven member, spring means urging said members out of frictional engagement, a second spring means adapted to overcome said first spring means, centrifugal means attached to said driving member and adapted to act through said second spring means to cause engagement of said members upon increase of speed of said driving member, latching means adapted to disable said second spring means upon decrease of speed and thereby permit said first spring means to cause disengagement of said members, said latching means including coacting members having inclined latching surfaces adapted to be held in engagement by surface friction and by spring means, spring means adapted to urge said surfaces together, and means for disengaging said surfaces when the speed of said driving member falls below a predetermined point.

5. A clutch comprising driving and driven members, a lever for holding said members in driving inter-engagement, a spring urging the lever to its drive-establishing position, and means overcoming said spring at idling speeds of the driving member, including a centrifugally acting member giving said means effect, while permitting said means to yield to the spring at less than idling speeds.

6. A clutch comprising driving and driven members, a lever for holding said members in driving engagement, a spring urging the lever to its drive-establishing position, and means resisting the action of the spring on said lever at idling speeds, yieldable to the spring at lesser speeds.

7. A clutch for use with an internal combustion engine, comprising in combination, driving and driven members normally disengaged substantially at engine idling speed, spring means for applying drive-establishing pressure to said members, a pair of elements movable along the clutch axis and coacting to receive the thrust of the spring means, one of said elements being adapted to transmit such thrust, substantially unmodified, to the driving and driven members, levers adapted to multiply the thrust received by the other element, means for transmitting the multiplied thrust to the driving and driven members, centrifugal means acting on one of said elements for automatically interengaging the driving and driven members as the speed of rotation increases and to automatically disengage such members upon resumption of a substantially idling speed, and means automatically operable, incident to discontinuance of the operation of the engine, for permitting interengagement of said members, whereby such interengagement follows from such discontinuance.

8. In a clutch, in combination, a driving member and a driven member, means urging said members out of frictional engagement, spring means for applying pressure to interengage said members, centrifugal means acting through said spring means to cause engagement of said members upon increase of speed of the driving member, means for counter-acting said spring means, upon decrease of speed of the driving member, and for thus causing disengagement of said members, responsive to the first-mentioned means, said counter-acting means being controlled by the speed of the driving member to negative the counteracting effect when said speed further decreases predeterminedly.

9. In a clutch, in combination, a driving member and a driven member, means urging said members out of frictional engagement, spring means for applying pressure to interengage said members, two elements relatively movable along the clutch axis and coacting to receive the thrust of said spring means, centrifugal means acting through said spring means to cause engagement of said members, upon increase of speed of the driving member, means reacting between said elements for counteracting said spring means, upon decrease of speed of the driving member, and for thus causing disengagement of said members, responsive to the first-mentioned means, said counteracting means being controlled by the speed of the driving member to negative the counter-acting effect when said speed further decreases predeterminedly.

10. A clutch as set forth in claim 9, said latch means comprising elements centrifugally urging such means to its latched position.

11. A clutch comprising driving and driven members, means acting as a lever for holding said members in driving interengagement, a yielding means urging the lever means to its drive-establishing position, and means overcoming said yielding means at idling speeds of the driving member, including a power actuated member giving said overcoming means effect, while permitting said overcoming means to be overcome by the yielding means at less than idling speeds.

12. A clutch comprising driving and driven members, means acting as a lever for holding said members in driving engagement, means urging the lever means to its drive-establishing position, and means resisting the action of the urging means on the lever means at idling speeds, yieldable to the urging means at lesser speeds.

EDWIN R. EVANS.